Nov. 3, 1953 W. R. SCHETTLER 2,657,771
HAND BRAKE ARRANGEMENT
Filed Aug. 11, 1951 2 Sheets-Sheet 1
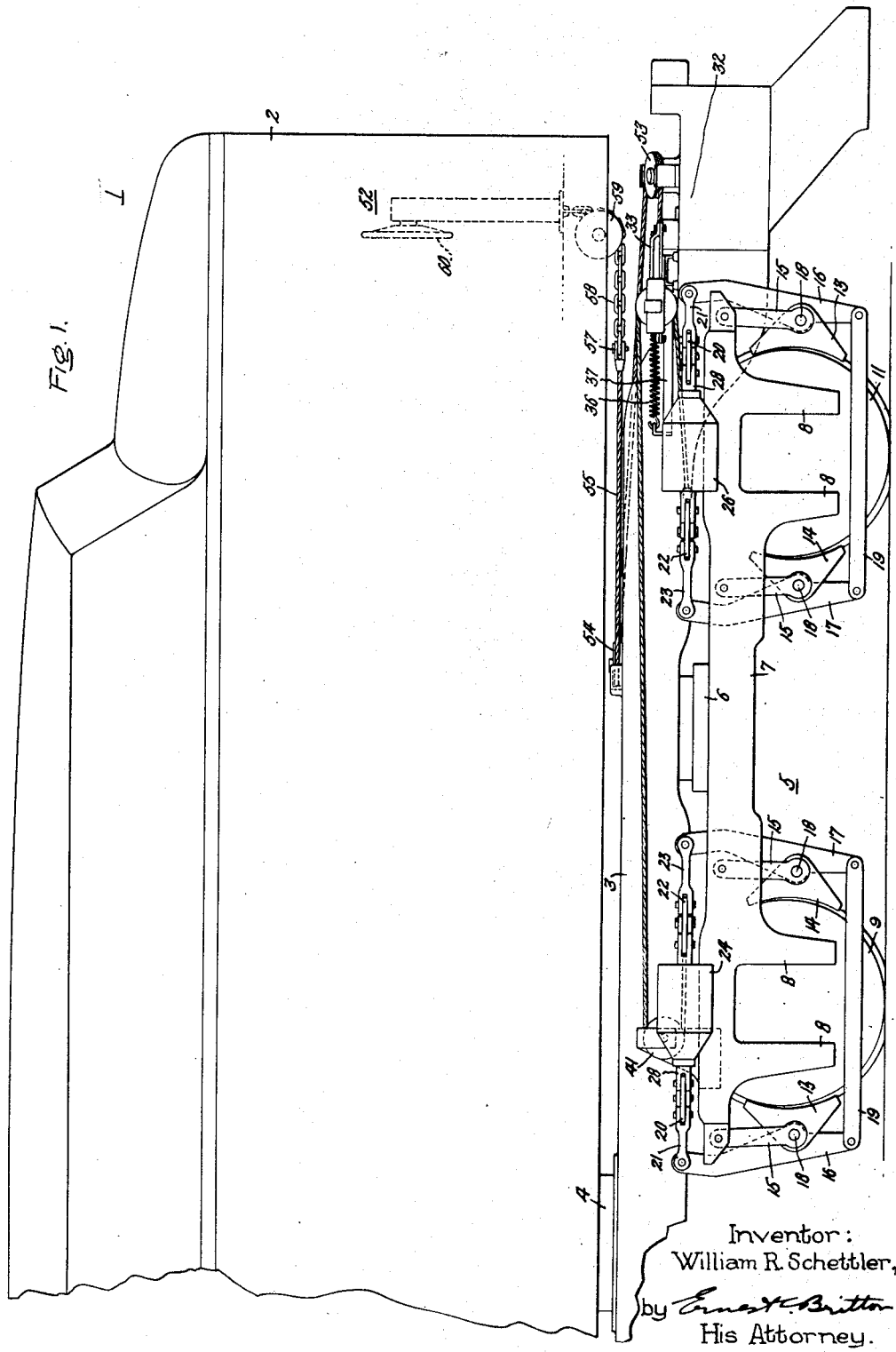
Inventor:
William R. Schettler,
by Ernest K. Britton
His Attorney.

Nov. 3, 1953 W. R. SCHETTLER 2,657,771
HAND BRAKE ARRANGEMENT
Filed Aug. 11, 1951 2 Sheets-Sheet 2
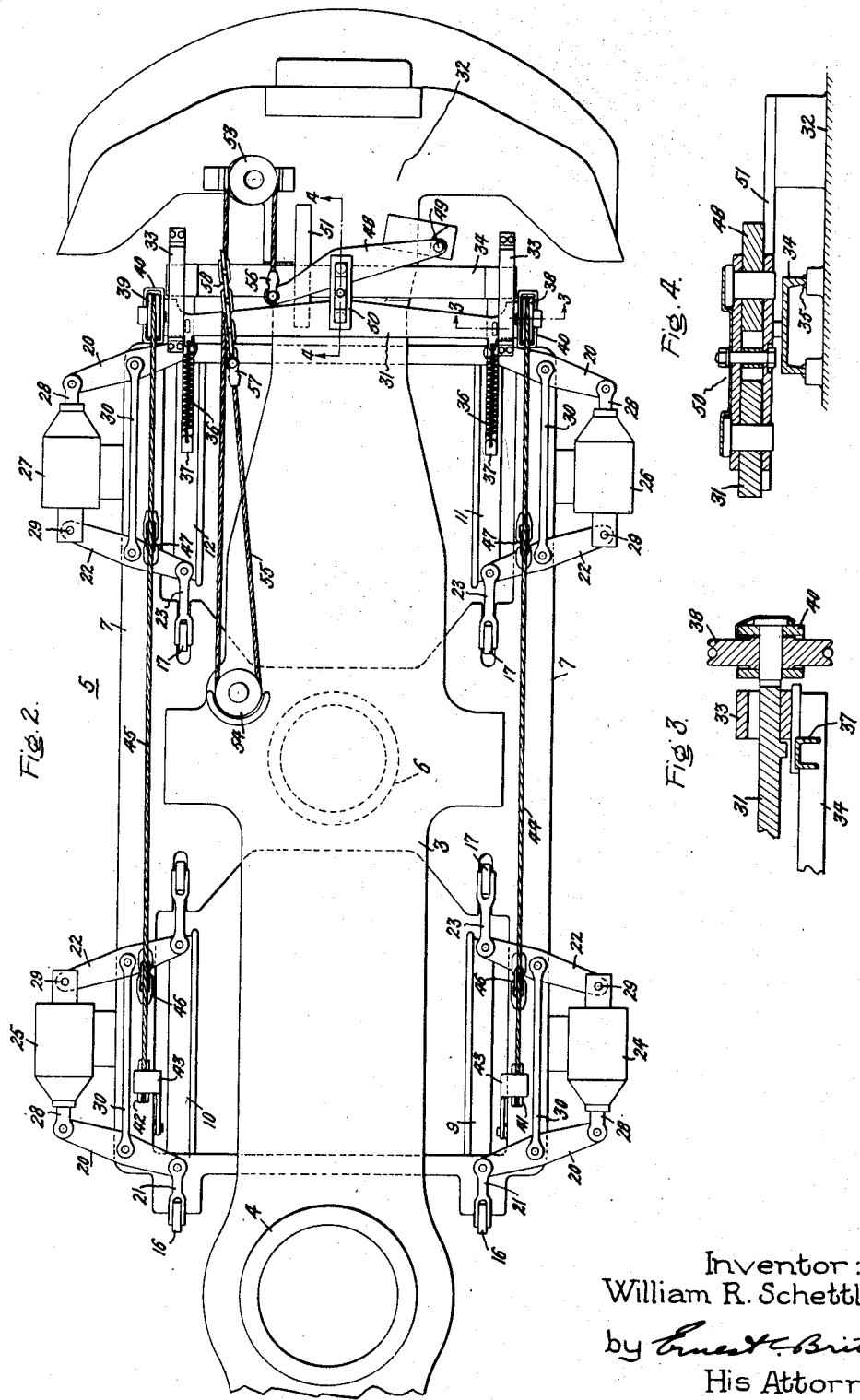
Inventor:
William R. Schettler,
by Ernest C. Britton
His Attorney.

Patented Nov. 3, 1953

2,657,771

UNITED STATES PATENT OFFICE 2,657,771

HAND BRAKE ARRANGEMENT

William R. Schettler, Lawrence Park, Pa., assignor to General Electric Company, a corporation of New York Application August 11, 1951, Serial No. 241,422

17 Claims. (Cl. 188—107)

1

This invention relates to brake rigging for railway vehicles, and more particularly to a hand brake arrangement for locomotives having trucks with power-applied brake rigging.

In the design of rail vehicles, for example, locomotives having trucks with power-applied brake rigging, it is customary to provide means for hand application of the brake rigging, for example, to set the brakes when the locomotive is not operating. In certain large locomotives, a span bolster is provided intermediate the locomotive cab and the trucks, thereby complicating the hand brake arrangement since the relative turning movement between the cab and the span bolster and between the span bolster and the trucks must be accommodated.

An object of this invention is to provide an improved hand brake arrangement for a rail vehicle.

Another object of this invention is to provide improved hand brake arrangements for a rail vehicle having a span bolster intermediate the cab and the trucks.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with the preferred embodiment of this invention, each wheel of a truck pivotally connected to a span bolster which, in turn, is pivotally connected to the locomotive cab, is provided with unit clasp brake rigging. A plurality of air cylinders are mounted on the truck frame and respectively connected to apply the unit clasp brake rigging on each of the wheels. A brake beam is slidingly mounted on the upper surface of the span bolster with cables respectively connecting its ends to operate the brake rigging on each wheel. A lever is pivotally mounted on the span bolster and connected to move the brake beam to apply the brake rigging. The lever is in turn connected by a cable to the hand brake stand in the cab of the locomotive. This improved hand brake arrangement is therefore divided into two sections, the first beginning with the brake rigging and extending through the cables to the brake beam and lever on the span bolster thus accommodating the lateral and turning movement between the truck and the span bolster, and the second beginning with the lever and extending to the hand brake

2 stand in the cab permitting free turning of the span bolster with respect to the cab.

In the drawing, Fig. 1 is a side elevational view illustrating the improved hand brake arrangement of this invention applied to a locomotive having a span bolster intermediate the cab and trucks; Fig. 2 is a vertical view showing the span bolster and truck with the improved hand brake arrangement of this invention; Fig. 3 is a cross sectional view taken along the line 3—3 of Fig. 2; and Fig. 4 is a cross sectional view taken along the line 4—4 of Fig. 2.

Referring now to the drawing, there is shown a locomotive 1 having a cab 2 with a span bolster 3 pivotally connected thereto by means of a suitable center bearing 4. One truck 5, of a plurality of trucks is shown, pivotally connected to the span bolster 3 by a suitable center bearing 6. The truck 5 is provided with side frame members 7 having suitable bearing pedestals 8 depending therefrom, for accommodating the journal boxes (not shown) for the wheels 9, 10, 11, and 12.

Each of the wheels 9, 10, 11 and 12 is provided with unit type clasp brake rigging with brake heads 13 and 14 supported from the side frames 7 by means of brake hanger levers 15. Live brake levers 16 and 17 are respectively pivotally connected to the brake heads 13 and 14, as at 18, and their lower extremities are connected by pull rods 19 arranged on either side of the wheels 9, 10, 11 and 12. The upper extremities of the live brake levers 16 are connected to live cylinder levers 20 by means of suitable links 21, and the upper extremities of the live brake levers 17 are connected to dead levers 22 by means of suitable links 23. Air cylinders 24, 25, 26, and 27 are mounted on the truck side frames 7 and their push rods 28 are connected to the live cylinder levers 29. The ends of the dead levers 22 are pivoted as at 29, and pull rods 30 interconnect each pair of live cylinder levers 20 and dead levers 22 intermediate their ends as shown in Fig. 2. It will now be readily seen that application of air to the air cylinders 24, 25, 26, and 27 from any suitable source (not shown) will cause the push rods 28 to move outwardly to apply the brake rigging on each wheel.

In order to provide for hand application of the unit clasp brake rigging on each wheel, a brake beam 31 is provided slidingly mounted on the upper surface of the forward extension 32 of the span bolster 3. The transversely arranged brake beam 31 is supported and guided by guides 33 mounted on the ends of channel-shaped supporting member 34, which in turn is secured to the span bolster extension 32 in any suitable manner, as by welding as at 35, as shown in Fig. 4. The brake beam 31 is biased to the released brake position by suitable springs 36 secured to longitudinally extending members 37, which in turn are secured to the supporting member 34. Sheaves 38 and 39 are attached to the ends of the brake beam 31 by suitable mounting brackets 40, and sheaves 41 and 42 are attached to the side frames 7 at the end of the truck 5 remote from the brake beam 31 by suitable mounting brackets 43. A pair of cables 44 and 45 pass respectively over the sheaves 38 and 41, and 39 and 42, and their ends 46 and 47 are respectively attached to the dead levers 22 on each side of the trucks at points on the side of the pull rods 30 remote from the pivot points 29. It will now be readily seen that movement of the brake beam 31 toward the right as shown in Figs. 1 and 2 will exert force on the cables 44 and 45 to pull the dead levers 22, thus applying the brake rigging on each of the wheels.

It has been found necessary to step up the pulling force exerted by the brake beam 31 and, therefore, a lever 48 is provided pivotally mounted on the upper surface of the extension 32 of the span bolster 3, with one end pivoted to one side of the span bolster extension 32 as at 49. The lever 48 is connected to the midpoint of the brake beam 31 by means of a link 50, shown in more detail in Fig. 4, and a suitable guiding member 51 serves to support and guide the lever 48. In order to connect the other end of the lever 48 to the hand brake stand 52 in the cab 2, a sheave 53 is mounted on the span bolster extension 32 on the side opposite from the pivot point 49 of the lever 48, and another sheave 54 is mounted on the span bolster 3 on the same side thereof as the sheave 53 and on the side of the brake beam 31 remote from the lever 48. A cable 55 passes over the sheaves 53 and 54 and has its one end 56 connected to the end of the lever 48 and its other end 57 connected to chain 58 which passes over sheave 59 in the cab to the hand wheel 60 of the hand brake stand 52.

In operation, winding up the hand wheel 60 on the hand brake stand 52 exerts a pulling force through chain 58 and cable 55 on the end of lever 48, which in turn moves the brake beam 31 toward the right as shown in Figs. 1 and 2. Movement of the brake beam 31 in turn through sheaves 38 and 39, and 41 and 42, and cables 44 and 45 transmits the pulling force to the dead levers 22 to apply the brake rigging on all of the wheels.

It will be readily apparent that this improved hand brake arrangement provides a practical solution to the problem of large transverse movement between the truck brake rigging and the hand brake stand 52 in the cab. It can be readily seen that this hand brake arrangement is divided into two sections, the first beginning with the dead levers 22 and extending through the cables 44 and 45 to the brake beam 31 and the lever 48. This system accommodates the lateral and turning movements between the truck 5 and the span bolster 3. The rest of the system begins with the lever 48 and extends through the sheaves 53 and 54 and the cable 55 to the hand brake stand 52 in the cab 2. This permits the free turning of the span bolster 3 with respect to the locomotive cab. It will be noted that in order to obtain maximum angularity for any locomotive cab movement, the sheave 54 is positioned as far away from the hand brake stand 52 is as practically possible. It will now be readily apparent that this invention provides an improved hand brake arrangement for a rail vehicle, especially a vehicle such as a locomotive having a span bolster arranged intermediate the cab and the trucks.

While I have shown and described a particular embodiment of this invention, further modifications and improvements will occur to those skilled in the art. I desire it to be understood, therefore, that this invention is not limited to the forms shown, and I intend in the appended claims to cover all modifications which do not depart from the spirit and scope of this invention.

What I claim as new and desire to secure by Letters Patent of the United States is:

1. In a rail vehicle having a truck including a frame pivotally connected to a supported member and a plurality of pairs of wheels, clasp brake rigging respectively associated with the wheels on each side of said truck, a plurality of air cylinders mounted on said truck frame and respectively operatively connected to apply said brake rigging on each side of said truck, and means for providing hand application of said brake rigging on each side of said truck including a tranversely arranged brake beam slidingly mounted on said supported member for movement longitudinally with respect thereto and having a sheave on each end thereof, a cable passing over each of said sheaves and having its ends respectively connected to said brake rigging on one side of said truck whereby movement of said brake beam applies said brake rigging, and manually actuated means for moving said brake beam.

2. In a rail vehicle having a truck including a frame pivotally connected to a supported member and a plurality of pairs of wheels, unit clasp brake rigging respectively associated with each of said wheels, a plurality of air cylinders mounted on said truck frame and respectively operatively connected to apply said unit clasp brake rigging on each of said wheels, and means for providing hand application of said unit clasp brake rigging on each of said wheels including a transversely arranged brake beam slidingly mounted on said supported member adjacent one end of said truck frame for movement longitudinally with respect thereto and having a sheave on each end thereof, a sheave on each side of said truck frame adjacent the end remote from said brake beam, a pair of cables respectively passing over the sheaves on each side of said truck and having their ends respectively connected to said unit clasp brake rigging on each side of said truck whereby movement of said brake beam applies said unit clasp brake rigging on all of said wheels, and manually actuated means for moving said brake beam.

3. In a rail vehicle having a truck including a frame pivotally connected to a supported member and a plurality of pairs of wheels, unit clasp brake rigging respectively associated with each of said wheels, a plurality of air cylinders mounted on said truck frame and respectively operatively connected to apply said unit clasp brake rigging on each of said wheels, a plurality of live cylinder levers respectively connecting each of said air cylinders with a portion of its associated unit clasp brake rigging, a plurality of dead levers respectively having one end connected to another portion of said unit clasp brake rigging on each of said wheels and having their other ends pivoted on said truck frame, a plurality of pull rods respectively connecting each pair of live and dead levers intermediate their ends, and means for providing hand application of said unit clasp brake rigging on each of said wheels including a transversely arranged brake beam slidingly mounted on said supported member adjacent one end of said truck frame for movement longitudinally with respect thereto and having a sheave on each end thereof, a sheave on each side of said truck frame adjacent the end remote from said brake beam, a pair of cables respectively passing over the sheaves on each side of said truck and having their ends respectively connected to said dead levers on each side of said truck on the side of said pull rods remote from said pivoted ends of said dead levers whereby movement of said brake beam applies said unit clasp brake rigging on each of said wheels, and manually actuated means for moving said brake beam.

4. In a rail vehicle having a truck including a frame pivotally connected to a supported member and a plurality of pairs of wheels, unit clasp brake rigging respectively associated with each of said wheels, a plurality of air cylinders mounted on said truck frame respectively operatively connected to apply said unit clasp brake rigging on each of said wheels, a plurality of live cylinder levers respectively connecting each of said air cylinders with a portion of its associated unit clasp brake rigging, a plurality of dead levers respectively having one end connected to another portion of said unit clasp brake rigging on each of said wheels and having fixed pivots at their other ends, a plurality of pull rods respectively connecting each pair of live and dead levers intermediate their ends, and means for providing hand application of said unit clasp brake rigging on each of said wheels including a transversely arranged brake beam slidingly mounted on said supported member adjacent one end of said truck frame for movement longitudinally with respect thereto and having a sheave on each end thereof, a sheave on each side of said truck frame adjacent the end remote from said brake beam, a pair of cables respectively passing over the sheaves on each side of said truck and having their ends respectively connected to said dead levers on each side of said truck on the side of said pull rods remote from said pivoted ends of said dead levers whereby movement of said brake beam applies said unit clasp brake rigging on each of said wheels, spring means on said supported member for biasing said brake beam to a released brake position, a substantially transversely arranged lever having one end pivoted on one side of said supported member and connected to said brake beam at the midpoint thereof, and manually actuated means for applying force on the other end of said last-named lever to move said brake beam for applying said unit clasp brake rigging on each of said wheels.

5. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on said span bolster for movement longitudinally thereof, means operatively connecting said brake beam to said brake rigging whereby movement of said brake beam applies said brake rigging, and manually actuated means in said cab and operatively connected to move said brake beam.

6. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on the upper surface of said span bolster for movement longitudinally thereof, means operatively connecting said brake beam to said brake rigging whereby movement of said brake beam applies said brake rigging, and manually actuated means in said cab and operatively connected to move said brake beam.

7. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on the upper surface of said span bolster for movement longitudinally thereof, means operatively connecting said brake beam to said brake rigging whereby movement of said brake beam applies said brake rigging, manually actuated means in said cab and operatively connected to move said brake beam, and spring means on said span bolster for biasing said brake beam to a released brake position.

8. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on said span bolster for movement longitudinally thereof, means operatively connecting said brake beam to said brake rigging whereby movement of said brake beam applies said brake rigging, a lever pivoted to said span bolster and operatively connected to move said brake beam, and manually actuated means in said cab and operatively connected to operate said lever for moving said brake beam.

9. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on the upper surface of said span bolster for movement longitudinally thereof, means operatively connecting said brake beam to said brake rigging whereby movement of said brake beam applies said brake rigging, a substantially transversely arranged lever having one end pivoted to one side of the upper surface of said span bolster and connected to said brake beam at the midpoint thereof, and manually actuated means in said cab and operatively connected to the other end of said lever for moving said brake beam.

10. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, and means for providing hand application of said brake rigging including a transversely arranged brake beam slidingly mounted on the upper surface of said span bolster for movement longitudinally thereof, means operatively connecting said brake beam to said brake rigging whereby movement of said brake beam applies said brake rigging, a lever pivoted to the upper surface of said span bolster and operatively connected to move said brake beam, a sheave on the upper surface of said span bolster on the side of said lever remote from the pivot point of said truck, another sheave on the upper surface of said span bolster on the side of said lever remote from said first-named sheave, a cable having one end connected to said lever and passing over said sheaves, and manually actuated means in said cab and connected to the other end of said cable for operating said lever to move said brake beam.

11. In a rail vehicle having a cab, a span bolster pivotally connected to said cab, and a truck including a frame pivotally connected to said span bolster and a plurality of pairs of wheels, brake rigging associated with said wheels, power means on said truck frame operatively connected to apply said brake rigging, means for providing hand application of said brake rigging including a transversely arranged brake beam slidingly mounted on the upper surface of said span bolster for movement longitudinally thereof, means operatively connecting said brake beam to said brake rigging whereby movement of said brake beam applies said brake rigging, said brake beam being arranged adjacent one end of said truck frame, a substantially transversely arranged lever positioned on the side of said brake beam remote from the pivot point of said truck and having one end pivoted to one side of the upper surface of said span bolster, said lever being connected to said brake beam at the midpoint thereof, a sheave on the other side of said upper surface of said span bolster arranged on the side of said lever remote from said brake beam, another sheave on said other side of said upper surface of said span bolster arranged on the side of said brake beam remote from said lever, a cable having one end connected to the other end of said lever and passing over said sheaves, and manually actuated means in said cab and connected to the other end of said cable for operating said lever to move said brake beam.

12. In a rail vehicle having a cab, a span bolster pivotally connected to said cab, and a truck including a frame pivotally connected to said span bolster and a plurality of pairs of wheels, clasp brake rigging respectively associated with the wheels on each side of said truck, a plurality of air cylinders mounted on said truck frame and respectively operatively connected to apply said brake rigging on each side of said truck, and means for providing hand application of said brake rigging on each side of said truck including a transversely arranged brake beam slidingly mounted on the upper surface of said span bolster for movement longitudinally thereof and having a sheave on each end thereof, a cable passing over each of said sheaves and having its ends connected to said brake rigging on one side of said truck whereby movement of said brake beam applies said brake rigging, and manually actuated means in said cab operatively connected to move said brake beam.

13. In a rail vehicle having a cab, a span bolster pivotally connected to said cab, and a truck including a frame pivotally connected to said span bolster and a plurality of pairs of wheels, unit clasp brake rigging respectively associated with each of said wheels, a plurality of air cylinders mounted on said truck frame and respectively operatively connected to apply said unit clasp brake rigging on each of said wheels, and means for providing hand application of said unit clasp brake rigging on each of said wheels including a transversely arranged brake beam slidably mounted on the upper surface of said span bolster adjacent one end of said truck frame for movement longitudinally of said span bolster and having a sheave on each end thereof, a sheave on each side of said truck frame adjacent the end remote from said brake beam, a pair of cables respectively passing over the sheaves on each side of said truck and having their ends respectively connected to said unit clasp brake rigging on each side of said truck whereby movement of said brake beam applies said unit clasp brake rigging on all of said wheels, and manually actuated means in said cab and operatively connected to move said brake beam.

14. In a rail vehicle having a cab, a span bolster pivotally connected to said cab, and a truck including a frame pivotally connected to said span bolster and a plurality of pairs of wheels, unit clasp brake rigging respectively associated with each of said wheels, a plurality of air cylinders mounted on said truck frame and respectively operatively connected to apply said unit clasp brake rigging on each of said wheels, a plurality of live cylinder levers respectively connecting each of said air cylinders with a portion of its associated unit clasp brake rigging, a plurality of dead levers respectively having one end connected to another portion of said unit clasp brake rigging on each of said wheels and having fixed pivots for their other ends, a plurality of pull rods respectively connecting each of said live and dead levers intermediate their ends, and means for providing hand application of said unit clasp brake rigging on each of said wheels including a transversely arranged brake beam slidingly mounted on the upper surface of said span bolster adjacent one end of said truck frame for movement longitudinally of said span bolster and having a sheave on each end thereof, a sheave on each side of said truck frame adjacent the end remote from said brake beam, a pair of cables respectively passing over the sheaves on each side of said truck and having their ends respectively connected to said dead levers on each side of said truck on the side of said pull rods remote from said pivoted ends of said dead levers whereby movement of said brake beam applies said unit clasp brake rigging on each of said wheels, and manually actuated means in said cab and operatively connected to move said brake beam.

15. In a rail vehicle having a cab, a span bolster pivotally connected to said cab, and a truck including a frame pivotally connected to said span bolster and a plurality of pairs of wheels, unit clasp brake rigging respectively associated with each of said wheels, a plurality of air cylinders mounted on said truck frame and respectively operatively connected to apply said unit clasp brake rigging on each of said wheels, and means for providing hand application of said unit clasp brake rigging on each of said wheels including a transversely arranged brake beam slidingly mounted on the upper surface of said span bolster adjacent one end of said truck frame for movement longitudinally of said span bolster and having a sheave on each end thereof, a sheave on each side of said truck frame adjacent the end remote from said brake beam, a pair of cables respectively passing over the sheaves on each side of said truck and having their ends respectively connected to said unit clasp brake rigging on each side of said truck whereby movement of said brake beam applies said unit clasp brake rigging on all of said wheels, a lever pivoted to said upper surface of said span bolster and operatively connected to move said brake beam, and manually actuated means in said cab operatively connected to operate said lever for moving said brake beam.

16. In a rail vehicle having a cab, a span bolster pivotally connected to said cab and a truck including a frame pivotally connected to said span bolster and a plurality of pairs of wheels, unit clasp brake rigging respectively associated with each of said wheels, a plurality of air cylinders mounted on said truck frame and respectively operatively connected to apply said unit clasp brake rigging on each of said wheels, and means for providing hand application of said unit clasp brake rigging on each of said wheels including a transversely arranged brake beam slidingly mounted on the upper surface of said span bolster adjacent one end of said truck frame for movement longitudinally of said span bolster and having a sheave on each end thereof, a sheave on each side of said truck frame adjacent the end remote from said brake beam, a pair of cables respectively passing over the sheaves on each side of said truck and having their ends respectively connected to said unit clasp brake rigging on each side of said truck whereby movement of said brake beam applies said unit clasp brake rigging on all of said wheels, a lever pivoted to said upper surface of said span bolster and operatively connected to move said brake beam, a sheave on said upper surface of said span bolster on the side of said lever remote from the pivot point of said truck, another sheave on said upper surface of said span bolster on the side of said brake beam remote from said lever, a cable having one end connected to said lever and passing over said last two sheaves, and manually actuated means in said cab and connected to the other end of said last-named cable for operating said lever to move said brake beam.

17. In a rail vehicle having a cab, a span bolster pivotally connected to said cab, and a truck including a frame pivotally connected to said span bolster and a plurality of pairs of wheels, unit clasp brake rigging respectively associated with each of said wheels, a plurality of air cylinders mounted on said truck frame and respectively operatively connected to apply said unit clasp brake rigging on each of said wheels, a plurality of live cylinder levers respectively connecting each of said air cylinders with a portion of its associated unit clasp brake rigging, a plurality of dead levers respectively having one end connected to another portion of said unit clasp brake rigging on each of said wheels and having fixed pivots for their other ends, a plurality of pull rods respectively connecting each of said live and dead levers intermediate their ends, and means for providing hand application of said unit clasp brake rigging on each of said wheels including a transversely arranged brake beam slidingly mounted on the upper surface of said span bolster adjacent one end of said truck frame for movement longitudinally of said span bolster and having a sheave on each end thereof, a sheave on each side of said truck frame adjacent the end remote from said brake beam, a pair of cables respectively passing over the sheaves on each side of said truck and having their ends respectively connected to said dead levers on each side of said truck and on the side of said pull rods remote from said pivoted ends of said dead levers whereby movement of said brake beam applies said unit clasp brake rigging on each of said wheels, a substantially transversely arranged lever positioned on the side of said brake beam remote from the pivot point of said truck and having one end pivoted to one side of said upper surface of said span bolster, said lever being connected to said brake beam at the midpoint thereof, a sheave on the other side of said upper surface of said span bolster arranged on the side of said lever remote from said brake beam, another sheave on said other side of said upper surface of said span bolster arranged on the side of said brake beam remote from said lever, a cable having one end connected the other end of said lever and passing over said last two sheaves, and manually actuated means in said cab and connected to the other end of said last-named cable for operating said lever to move said brake beam.

WILLIAM R. SCHETTLER.

References Cited in the file of this patent

UNITED STATES PATENTS

| Number | Name | Date |
|---|---|---|
| 1,621,843 | Klasing | Mar. 22, 1927 |
| 2,064,367 | Baselt | Dec. 15, 1936 |
| 2,359,081 | Blomberg | Sept. 26, 1944 |
| 2,371,182 | Orr et al. | Mar. 13, 1945 |
| 2,391,664 | White | Dec. 25, 1945 |